US008800983B2

(12) United States Patent
Koch et al.

(10) Patent No.: US 8,800,983 B2
(45) Date of Patent: Aug. 12, 2014

(54) OPERATING TABLE COLUMN

(75) Inventors: Guido Koch, Karlsruhe (DE); Rolf Revenus, Kuppenheim (DE)

(73) Assignee: Maquet GmbH, Rastatt (DE)

( * ) Notice: Subject to any disclaimer, the term of this patent is extended or adjusted under 35 U.S.C. 154(b) by 409 days.

(21) Appl. No.: 13/369,447

(22) Filed: Feb. 9, 2012

(65) Prior Publication Data

US 2012/0216350 A1 Aug. 30, 2012

(30) Foreign Application Priority Data

Feb. 10, 2011 (DE) ........................ 10 2011 000 628

(51) Int. Cl.
*B23Q 3/00* (2006.01)
*A47C 31/00* (2006.01)
*A61G 13/02* (2006.01)
*A61G 13/04* (2006.01)

(52) U.S. Cl.
CPC ................ *A61G 13/04* (2013.01); *A61G 13/02* (2013.01)
USPC ................... 269/289 R; 269/55; 5/11; 5/607; 5/608; 248/652; 248/653; 248/654

(58) Field of Classification Search
USPC .......... 269/289 R, 55, 56, 63; 5/11, 607, 608; 248/652, 653, 654, 644; 108/4; 254/105
See application file for complete search history.

(56) References Cited

U.S. PATENT DOCUMENTS 2,217,783 A * 10/1940 Bell .................................. 5/614
3,206,188 A * 9/1965 Douglass, Jr. .................... 5/614
3,288,421 A * 11/1966 Peterson ....................... 248/396
3,633,901 A * 1/1972 Lindquist .......................... 5/608
3,868,076 A * 2/1975 Beagan, Jr. ................... 248/654
3,868,103 A * 2/1975 Pageot et al. ...................... 5/614
4,195,829 A * 4/1980 Reser ................................ 5/614
4,360,182 A * 11/1982 Titus ............................. 248/371
4,572,493 A * 2/1986 Hubert .............................. 5/608
4,762,459 A * 8/1988 Morita et al. ................. 414/680
4,958,817 A * 9/1990 Heller et al. ....................... 5/607
4,988,244 A * 1/1991 Sheldon et al. ............... 409/132
5,028,180 A * 7/1991 Sheldon et al. ............... 409/201
5,354,158 A * 10/1994 Sheldon et al. ............... 409/201
5,398,356 A * 3/1995 Pfleger .............................. 5/608
5,489,168 A * 2/1996 Sheldon et al. ............... 409/235

(Continued)

FOREIGN PATENT DOCUMENTS

DE 44 23 402 A1 1/1996

*Primary Examiner* — Lee D Wilson
*Assistant Examiner* — Jamal Daniel
(74) *Attorney, Agent, or Firm* — McCormick, Paulding & Huber LLP

(57) ABSTRACT

An operating table column has a column part a head part, and a plurality of actuating drives that each comprise a first element and a second element that can be linearly adjusted relative to this first element and that acts upon the head part. The first element of a first actuating drive is connected to the column part, while the head part is pivotably connected to the second element of the first actuating drive. The first element of a second actuating drive is pivotably connected to the column part, whereby, the head part is pivotably connected to the second element of the second actuating drive. The first element of a third actuating drive is connected at a distance from the head part to the second element of the first actuating drive and the second element of the third actuating drive is connected to the head part via respective universal joints.

11 Claims, 3 Drawing Sheets

(56) References Cited

U.S. PATENT DOCUMENTS

| | | | | |
|---|---|---|---|---|
| 5,528,782 | A * | 6/1996 | Pfeuffer et al. | 5/611 |
| 5,538,216 | A * | 7/1996 | Kinzel | 248/654 |
| 5,538,373 | A * | 7/1996 | Kirkham | 409/131 |
| 5,621,933 | A * | 4/1997 | Knapp et al. | 5/608 |
| 7,694,366 | B2 * | 4/2010 | Koch et al. | 5/608 |
| 8,161,586 | B2 * | 4/2012 | Koch et al. | 5/608 |
| 2010/0078866 | A1 * | 4/2010 | Pettersson | 269/63 |
| 2012/0216350 | A1 * | 8/2012 | Koch et al. | 5/607 |

* cited by examiner

OPERATING TABLE COLUMN

CROSS REFERENCE TO RELATED APPLICATIONS

Applicant hereby claims foreign priority benefits under U.S.C. §119 from German Patent Application No. 10 2011 000 628.1 filed on Feb. 10, 2011, the contents of which are incorporated by reference herein.

TECHNICAL FIELD

The invention relates to an operating table column comprising a column foot, a column part connected to the column foot, a head part that is intended for the connection to a patient support surface of the operating table, and a plurality of actuating drives that carry the head part and that each comprise a first element and a second element that can be linearly adjusted relative to this first element and that acts upon the head part.

BACKGROUND OF THE INVENTION

An operating table column of the previously cited type is known, for example from DE 44 23 402 A1. In the solution described in it the plate-shaped head part is connected in its middle via a Cardan joint to the upper end of a guide column. Three linear actuating drives are arranged around the guide column and at a distance from it with which drives the head part can be pivoted about the axes defined by the Cardan joint in order to perform in this manner the adjustment of inclination and of tilting of the patient support surface connected to the head part. The guide column and the three actuating drives are arranged on a carrier that can be adjusted by a separate lifting drive in a vertical direction relative to the column foot. This arrangement of the actuating drives is relatively expensive, requires a relatively large space and allows only a limited adjustment of the head part without the danger of a collision of mechanical parts inside the operating table column.

There is the desire, particular in the case of minimally invasive surgical interventions, to be able to bring the patient on the operating table into a position that allows the operating surgeon to work in an ergonomically advantageous manner. For this, combined movements of inclination and tilting of the patient support surface through large pivoting angles with the lowest possible column height are required.

SUMMARY OF THE INVENTION

The invention has the basic task of designing an operating table column of the initially cited type in such a manner that it allows a pivoting of the patient support surface about its longitudinal- and/or transverse axis with a large pivoting angle with a low space requirement and a low column height.

This task is solved for an operating table of the initially cited type in that the first element of a first actuating drive is connected to the column part in such a manner that the second element of the first actuating drive can only be adjusted in the direction of a vertical first axis, whereby the head part is pivotably connected to the second element of the first actuating drive about a horizontal second axis and about a third axis vertical to the latter axis, that the first element of a second actuating drive is pivotably connected to the column part about a pivot axis parallel to the second axis, whereby the head part is pivotably connected to the second element of the second actuating drive about an axis parallel to the second axis and about the third axis, and that the first element of a third actuating drive is connected at a distance from the head part to the second element of the first actuating drive and the second element of the third actuating drive is connected to the head part via respective universal joints.

In the solution of the invention the head part is carried only by the actuating drives. It is not directly supported on the column part. The adjustment of the head part about an axis parallel to the second axis in accordance with a movement of inclination of the patient support surface about its transverse axis takes place only by a differently wide extension of the second element of the first and of the second actuating drives. The change in distance occurring there between the first and the second actuating drive is compensated by a pivoting of the second actuating drive about its connection axis to the column part. A pivoting of the head part about the third axis in accordance with a tilting movement of the patient support surface about its longitudinal axis takes place only by a movement of the second element of the third actuating drive. The latter is connected to the movable second element of the first actuating drive and therefore requires no guidance on the column part. The suggested solution makes possible an extremely compact arrangement of the actuating drives about the column part and at the same time a large adjustment angle for the inclination and tilting of the patient support surface without there being any danger of an inner collision of the mechanical parts inside the operating table column.

The second elements of the first and of the second actuating drives are preferably connected to one another by a rod in an articulation containing the second axis and an axis parallel to the latter, whereby the head part is pivotably supported on the rod forming the third axis. Thus, the pivot axes for the adjustment of the head part lie practically in the plane of the head part and therefore close to the plane of the patient support surface. Thus, the distance of the center of gravity of the patient and of the support surface on the pivot axes of the head part is kept low, as a result of which even the tipping moments occurring during the pivoting of the patient support surface can be kept small. On the other hand, in the traditional solutions the pivoting point of the head part and therewith of the patient support surface lie frequently at a relatively large distance underneath the patient support surface, as a result of which during the inclination and tilting of the patient support surface a large shifting of the center of gravity of the patient and of the support surface takes place with the consequence that great tipping moments occur.

In a preferred embodiment of the invention the column part comprises a vertical guide support and a carrier frame that can be adjusted vertically on the latter by a lifting drive, to which carrier frame the first element of the first actuating drive is rigidly connected and the first element of the second actuating drive is connected in such a manner that it can pivot about its pivot axis. Thus, a height adjustment of the head part over a large travel path can take place even if the head part can already be adjusted in height solely by a uniform moving of the second elements of the first and of the second actuating drives.

The actuating drives are preferably formed by piston cylinder arrangements actuated by pressure agent, even if other types of linear positioning devices such as, for example, worm drives could be used.

A preferred solution provides for a formation of the actuating drives as hydraulic cylinders such that the second element of the first actuating drive extends as a piston rod axially through a cylinder forming the first element of the first actuating drive, whereby the one, upper end of the piston rod is connected to the head part and the other, opposite end of the piston rod is connected to the first element of the third actuating drive.

In order to ensure the necessary rigidity and operational safety of the previously described adjustment device, it is purposeful if the first element of the second actuating drive is guided in a fork of the carrier frame at a distance from its pivot axis in such a manner that it can not move in the direction of the pivot axis and therefore even the support of this pivot axis is not unnecessarily loaded by the forces acting upon the head part.

Further advantages and features of the invention result from the following description that explains the invention using an exemplary embodiment in conjunction with the attached drawings, in which:

DETAILED DESCRIPTION OF THE PREFERRED EMBODIMENT

Figure 1:
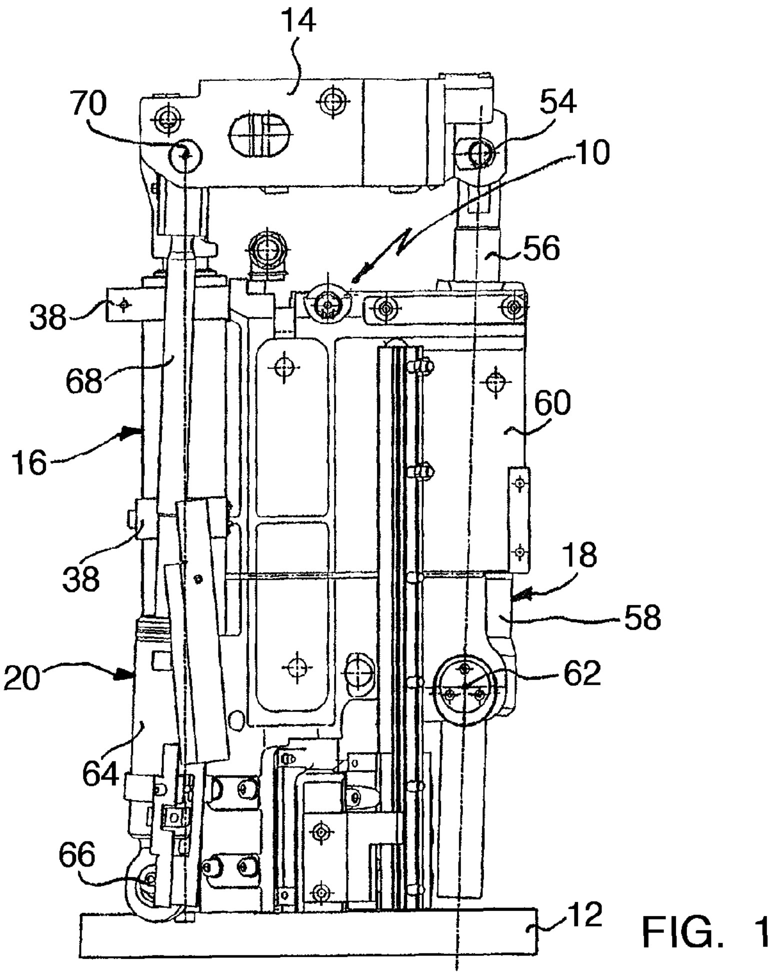
FIG. 1 shows a lateral view of a operating table column in accordance with the invention without covering elements in the direction of the arrow A in FIG. 2.
Figure 2:
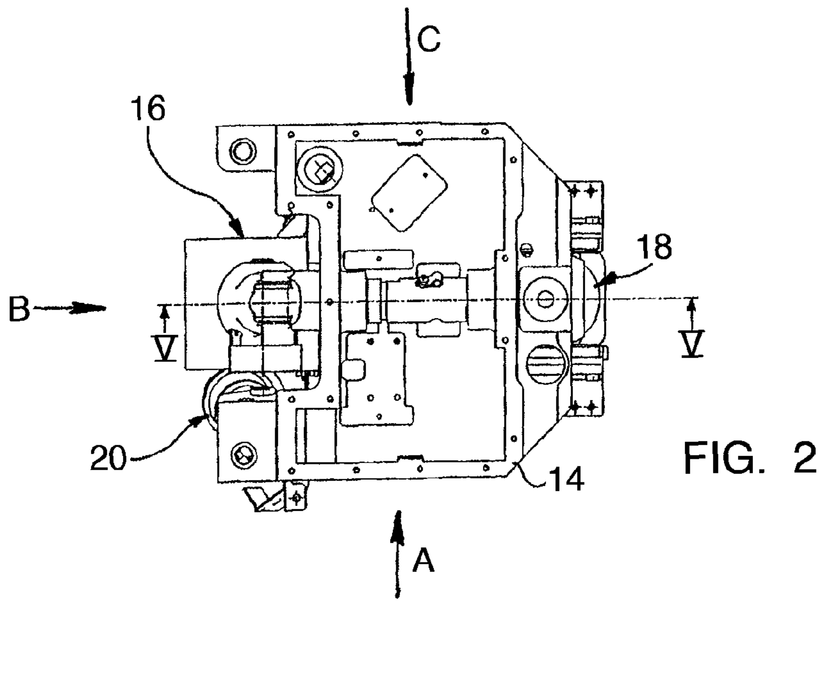
FIG. 2 shows a top view onto the operating table column without column foot shown in FIG. 1, FIGS. 3 and 4 each show a lateral view of the operating table column in the direction of the arrows B and C in FIG. 2.

The operating table column shown in the figures comprises a column part generally designated with 10, an only schematically indicated column foot 12, a head part 14 intended for the connection to a patient support surface (not shown), as well as a first actuating drive 16, a second actuating drive 18 and a third actuating drive 20 that jointly carry the head part 14.

Figure 5:
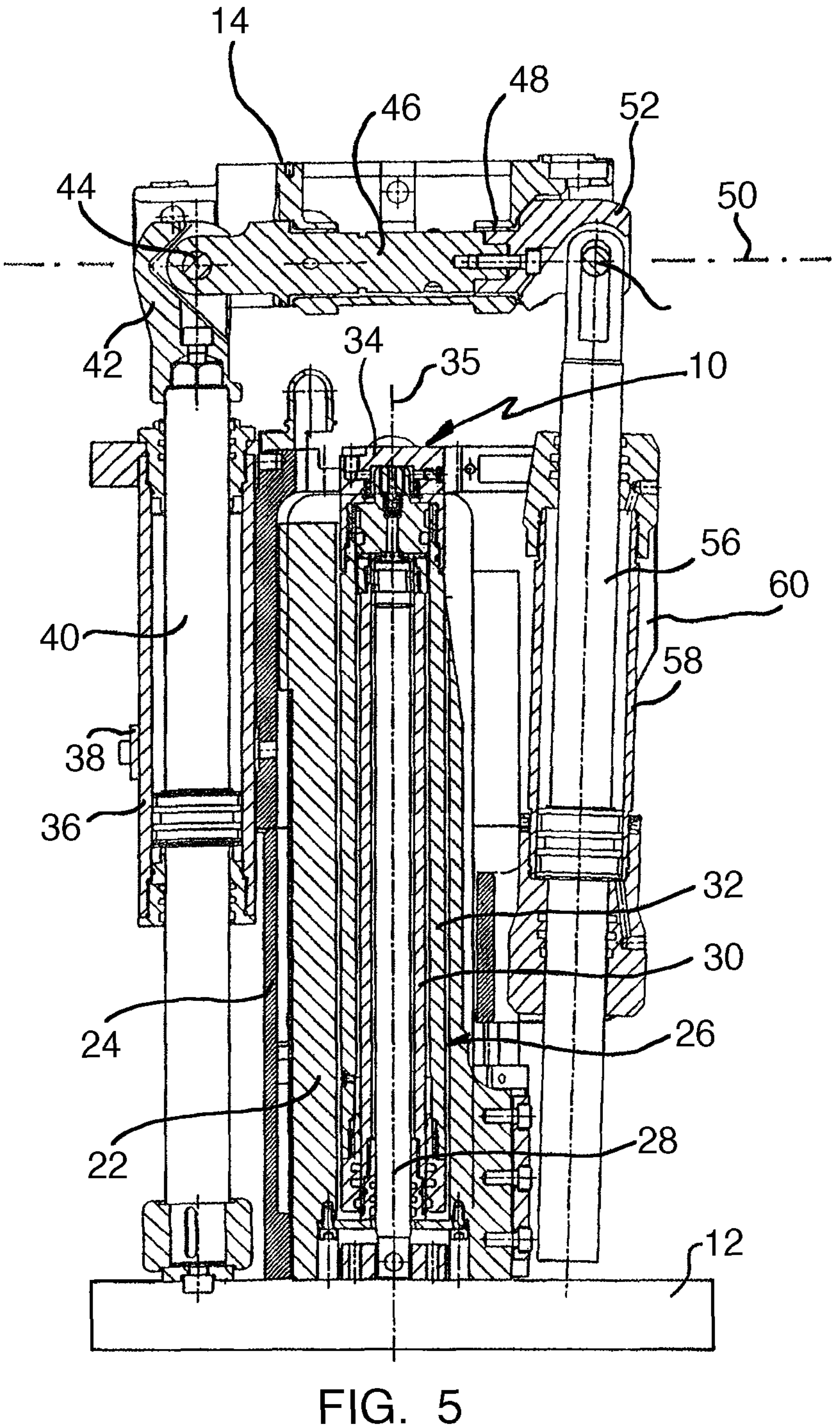
FIG. 5 shows a section through the operating table column along line V-V in FIG. 2.

The column part 10 consists of a guide support 20 and of a carrier frame 24 that is guided in a height-adjustable manner on the guide support. The height adjustment takes place by a lifting drive 26 that is arranged inside the guide support 22 (FIG. 5) and is designed in the form of a known hydraulic telescopic cylinder with a piston rod 28 permanently connected to the foot part 12, with a first inner cylinder 30 and a second outer cylinder 32 connected at its upper end to a horizontal plate part 34 of the carrier frame 24. The carrier frame 24 can be raised by extending the telescopic cylinder 30, 32 in the direction of the vertical axis 35.

The carrier frame 24 serves to hold the first and the second actuating drives 16 and 18. The actuating drives are also constructed as hydraulic cylinders. The first actuating drive 16 has a cylinder 36 that forms its first element and that is rigidly fastened on the carrier frame 24 with the aid of clamps 38. A piston rod 40 forming the second element of the actuating drive 16 extends through the cylinder 36. The upper end of the piston rod 40 is connected to an articulation head 42 that is articulated to the one end of a connection rod 46 in such a manner that it can pivot about a horizontal second axis 44. This connection rod 46 is supported in a support 48 extending through the head part 14 in such a manner that it can rotate about a third axis 50 perpendicular to the second axis 44 and is connected at its end opposite the articulation head 42 to an articulation head 52 that for its part is articulated to the upper end of a piston rod 56 about an axis 54 parallel to the axis 44 which forms the second element of the second actuating drive 18. The cylinder 58 forming the first element of the second actuating drive 18 and receiving the piston rod 56 is supported by its lower end between two cheeks 60 of the carrier frame 24 in such a manner that it can pivot about an axis 62 parallel to the axes 44 and 54. Thus, the cylinder 58 can pivot about the axis 62 but is guided between the cheeks 60 in such a manner that it cannot execute any movement in the direction of the axis 62.

Figure 3:
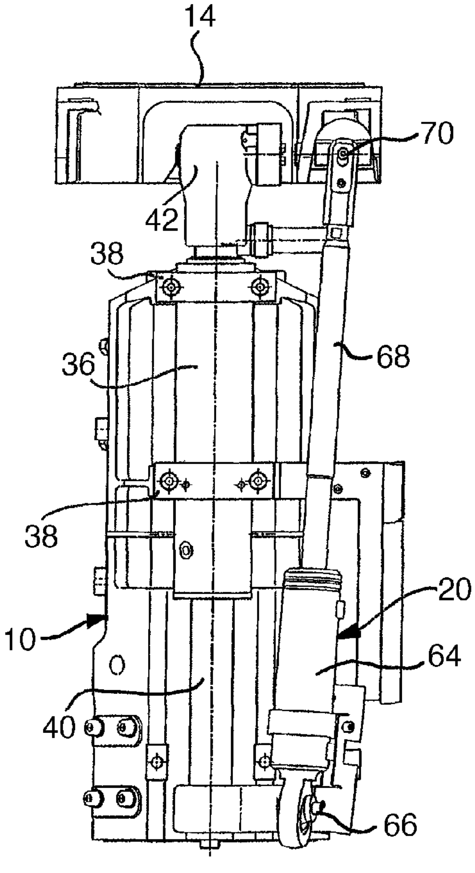
Figure 4:
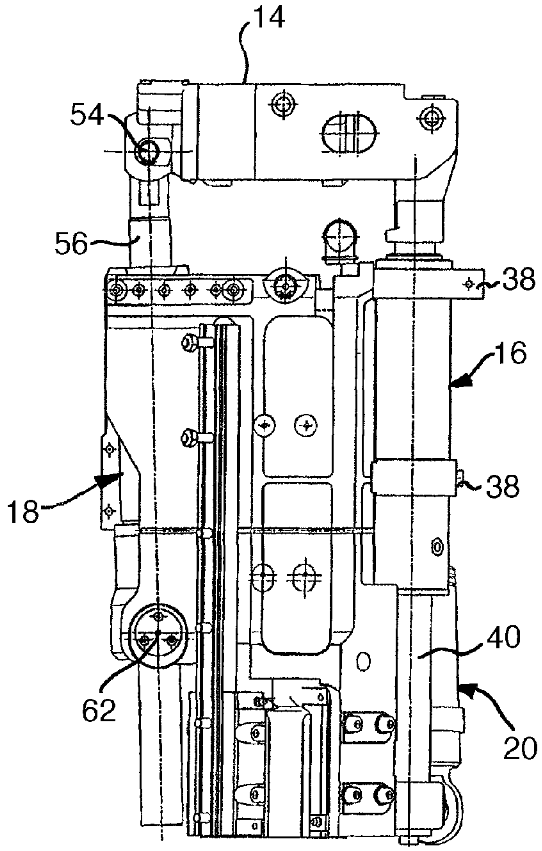

Even the third actuating drive 20 is constructed as a hydraulic cylinder. The cylinder 64 forming the first element of the third actuating drive 20 is connected to the lower, free and of the piston rod 40 of the first actuating drive 16 via a universal joint 66. The piston rod 68 of the third actuating drive 20 is articulated by its upper end via a universal joint 70 to the head part 14 (FIG. 3). Thus, the head part 14 is supported and stabilized at three different points.

If the piston rods 40 and 56 of the first actuating drive 16 and of the second actuating drive 18 are jointly extended equally far, then the head part 14 is raised. If the piston rods 40 and 56 are extended unequally far, then the head part 14 is pivoted to the left or to the right about the axes 44 and 54 in FIG. 5. The shortening of the distance between the two piston rods 40 and 56 of the two actuating drives 16 and 18 that takes place is compensated by a pivoting of the second actuating drive 18 about its pivot axis 62. If the piston rod 68 of the third actuating drive 20, that is also adjusted upon an adjustment of the piston rod 40 of the first actuating drive 16, is moved in or out, the head part 14 is pivoted about the third pivot axis 50.

As the previous description and the figures show, the solution of the invention results in an extremely compact arrangement that nevertheless makes possible large pivot angles in the inclination and tilting of the head part and thus of a patient support surface without the danger of a self-collision of the column parts. Since the axes of inclination and tilting are inside the head part 14 and therefore directly under the patient support surface, the shift of the center of gravity of a patient lying on the support surface is slight during pivoting of the support surface, as a result of which even the tipping moments acting on the OP table column can be kept small.

While the present invention has been illustrated and described with respect to a particular embodiment thereof, it should be appreciated by those of ordinary skill in the art that various modifications to this invention may be made without departing from the spirit and scope of the present.

What is claimed is:

1. An operating table column comprising a column foot, a column part connected to the column foot, a head part that is intended for the connection to a patient support surface of the operating table, and a plurality of actuating drives that carry the head part and that each comprise a first element and a second element that can be linearly adjusted relative to this first element and that acts upon the head part, wherein the first element of a first actuating drive is connected to the column part in such a manner that the second element of the first actuating drive can only be adjusted in the direction of a vertical first axis, whereby the head part is pivotably connected to the second element of the first actuating drive about a horizontal second axis and about a third axis perpendicular to the latter axis, that the first element of a second actuating drive is pivotably connected to the column part about a pivot axis parallel to the second axis, whereby the head part is pivotably connected to the second element of the second actuating drive about an axis parallel to the second axis and about the third axis, and that the first element of a third actuating drive is connected at a distance from the head part to the second element of the first actuating drive and the second element of the third actuating drive is connected to the head part via respective universal joints.

2. The operating table column according to claim 1, wherein the second elements of the first and of the second actuating drives are connected to one another by a rod in an articulation containing the second axis and an axis parallel to the latter one, and that the head part is pivotably supported on the rod forming the third axis.

3. The operating table column according to claim 1, characterized in that wherein the column part comprises a vertical guide support and a carrier frame that can be adjusted vertically on the latter by a lifting drive, to which carrier frame the first element of the first actuating drive is rigidly connected and the first element of the second actuating drive is connected in such a manner that it can pivot about its pivot axis.

4. The operating table column according to claim 1, wherein the actuating drives are formed by piston cylinder arrangements actuated by pressure agent.

5. The operating table column according to claim 4, wherein the second element of the first actuating drive extends as a piston rod axially through a cylinder forming the first element of the first actuating drive, whereby the one end of the piston rod is connected to the head part and the other end of the piston rod is connected to the first element of the third actuating drive.

6. The operating table column according to claim 3, wherein the first element of the second actuating drive is guided in a fork of the carrier frame at a distance from its pivot axis.

7. The operating table column according to claim 2, wherein the column part comprises a vertical guide support and a carrier frame that can be adjusted vertically on the latter by a lifting drive, to which carrier frame the first element of the first actuating drive is rigidly connected and the first element of the second actuating drive is connected in such a manner that it can pivot about its pivot axis.

8. The operating table column according to claim 2, wherein the actuating drives are formed by piston cylinder arrangements actuated by pressure agent.

9. The operating table column according to claim 3, wherein the actuating drives are formed by piston cylinder arrangements actuated by pressure agent.

10. The operating table column according to claim 4, wherein the first element of the second actuating drive is guided in a fork of the carrier frame at a distance from its pivot axis.

11. The operating table column according to claim 5, wherein the first element of the second actuating drive is guided in a fork of the carrier frame at a distance from its pivot axis.

* * * * *